United States Patent [19]
Crabtree

[11] Patent Number: 4,910,239
[45] Date of Patent: Mar. 20, 1990

[54] NON-TOXIC SCREEN PRINTING COMPOSITION

[76] Inventor: David W. Crabtree, 1105 Crab Orchard Dr., Apt. 1-B, Raleigh, N.C. 27607

[21] Appl. No.: 217,314

[22] Filed: Jul. 11, 1988

[51] Int. Cl.$^4$ .......................... C08K 5/34; C08K 5/10; C08L 33/10
[52] U.S. Cl. .................................... 524/104; 524/291; 524/560
[58] Field of Search ............................... 524/291, 104

[56] References Cited

U.S. PATENT DOCUMENTS

| | | | |
|---|---|---|---|
| 3,993,831 | 11/1976 | Vassiliades | 428/307 |
| 4,163,001 | 7/1979 | Carumpalos | 524/247 |
| 4,225,475 | 9/1980 | Carumpalos | 524/394 |
| 4,515,849 | 5/1985 | Keino et al. | 428/201 |

Primary Examiner—Joseph L. Schofer
Assistant Examiner—John J. Guarriello
Attorney, Agent, or Firm—Rhodes, Coats & Bennett

[57] ABSTRACT

The present invention comprises a screen printing ink or coating composition that includes methyl salicylate combined with a resin composition. In the case of ink the composition further includes pigments. The methyl salicylate acts as a solvent and functions to dissolve the resin and pigment compositions.

10 Claims, No Drawings

# NON-TOXIC SCREEN PRINTING COMPOSITION

FIELD OF THE INVENTION

The present invention relates to screen printing and more particularly to a non-toxic screen printing ink or coating composition.

BACKGROUND OF THE INVENTION

Screen printing has long been a very practical and economical means of coloring or coating designs, letters, insignia, etc., on all types of substrates. For example, apparel screen printing has developed into a tremendous industry.

While screen printing is widely used it is not without its problems and drawbacks. There is one major problem and concern in screen printing—the toxicity of vapor that emanates from the solvent in the ink composition. Invariably, solvents typically used in screen printing inks and coatings are toxic and when they evaporate from the substrate tend to cause toxic vapors to be left in and around the environment occupied by workers.

To deal with this problem, screen printers have been required to make substantial capital investments in expensive ventilation systems that sometimes are not capable of reducing the levels of toxic vapors below acceptable standards. Obviously, these ventilation systems are expensive and add to the cost of the screen printing operation. It is also conceivable that even with such ventilation systems that the quantity of screen printing activity that can be carried on in any one facility is limited by the ability of the ventilation system to exhaust the toxic vapors from the atmosphere in and around the workers. Beyond that, irrespective of the efficiency of the ventilation systems, workers are still exposed to the resulting toxic fumes and that in itself presents a very significant potential danger to workers in and around screen printing facilities.

Therefore, there is and continues to be a need for an efficient non-toxic screen printing ink or composition.

SUMMARY AND OBJECTS OF THE INVENTION

The present invention entails a screen printing ink or coating composition that is non-toxic in terms of the evaporative vapors given off by the composition after it has been applied to a substrate. More particularly, the screen printing ink or coating composition of the present invention includes methyl salicylate which acts as a solvent to dissolve a resin composition. The methyl salicylate mixed with the resin composition forms a clear acrylic base that can itself be applied directly or can be mixed with a pigment composition to form a screen printing ink.

It is therefore an object of the present invention to provide a screen printing composition whose vapor is non-toxic.

Also, it is an object of the present invention to provide a screen printing coating composition that utilizes compositions that have not been found to be carcenogenic.

Still a further object of the present invention resides in the provision of a screen printing or coating composition that has a high gloss characteristic.

Still a further object of the present invention resides in the provision of a screen printing composition that has improved adhesive capability.

Another object of the present invention resides in the provision of a screen printing composition that has wide versatility inasmuch as the composition is compatable with various types of resins and pigments.

Another object of the present invention resides in the provision of a screen printing composition that includes a solvent that has excellent pigment wetting characteristics.

Other objects and advantages of the present invention will become apparent and obvious from a study of the following description.

DETAILED DESCRIPTION OF THE INVENTION

The present invention relates to a composition and as disclosed herein the composition of the present invention entails a screen printing ink or coating composition.

The basic constituents of the composition comprise a solvent in the form of methyl salicylate. Mixed with the methyl salicylate is a resin composition. It is understood that this resin composition is of the type suitable for making screen printing inks and coatings. The methyl salicylate and resin composition form an aorylic base. This acrylic base can be applied to a substrate without the addition of coloring pigments. It is appreciated that as so applied the acrylic base formed by the methyl salicylate and resin composition would form a clear coating.

In one example of the composition of the present invention, the methyl salicylate comprises approximately 60% by weight of the acrylic base. The remaining 40% by weight is formed by the resin composition.

It is contemplated that in forming the acrylic base the methyl salicylate could form approximately 40 to 90 percent by weight of the base, and that the resin composition could form approximately 10 to 60 percent by weight of the base.

The following is an example of a basic screen printing ink composition which includes color:

| BASIC SCREEN PRINTING COMPOSITION | |
|---|---|
| | PARTS BY WEIGHT |
| Methyl salicylate | 45 |
| Resin | 27 |
| Pigments | 28 |
| | 100 |

The above screen printing ink composition would be formed by using a conventional or commercially available resin composition. A preferred resin would be methyl/butyl methacrylate co-polymer. Other suitable resins would include styrene, vinyl and other synthetic polymers.

Various commercially available pigment compositions including powders and powders dispersed in fluid could be utilized. It is contemplated that in the above example that dried pigment powder would be utilized.

In a screen printing ink composition of the type illustrated in the example above, it is appreciated that the percentage of the various compositions could vary depending on the type of application and other conditions. It is contemplated that in the above example of the ink composition, that methyl salicylate may range from approximately 40 to 80 percent by weight, the resin composition could range from approximately 5 to 55 percent by weight, and the pigment could range from approximately 5 to 40 percent by weight. It should be appreciated that this relatively wide range of percentage weight for the pigment composition is due in part at least to the significant variation in the molecular weights of the various color pigments.

The present composition can be embodied in various forms. An example of such a screen printing ink composition is as follows:

| ACRYLIC, WATER REDUCIBLE RED SCREEN PRINTING INK | PARTS BY WEIGHT |
|---|---|
| Clear Acrylic Base (60% by wt. of methyl salicylate and 40% by wt. resin composition) | 56.0 |
| WL-51 aqueous acrylic dispersion, Rohm and Haas (pre-coelasced 10% by utilizing 17.3 parts of WL-51 composition to which is added 1.7 parts of methyl salicylate) | 19.0 |
| Mineral Spirits | 4.0 |
| Pigment, toluidine red light Hilton-Davis Sup R Conc (pigment solids 53%) | 14.0 |
| Methyl Salicylate | 7.0 |
| | 100.0 |

To prepare the above composition the prepared clear acrylic base (prepared by mixing 60% by weight of methyl salicylate and 40% by weight resin composition) is first mixed with the pre-coelased WL-51 aqueous acrylic dispersion. Note that the WL-5 composition has been pre-coelased as described above. Next, the mineral spirits are added. That is followed by adding the pigment composition. Finally, the remaining portion of the methyl salicylate (7.0 parts) is added. In formulating the above compositions, grinding or high speed dispersion is not required. Brisk stirring is sufficient.

It should be pointed out that the proportions of the acrylic base and the acrylic dispersion may be varied. As seen above, the screen printing ink composition of the present invention can be provided with one or more co-solvents. That is, in addition to the methyl salicylate contained in the clear acrylic base, the composition can include additional co-solvents such as water, mineral spirits, alcohol (particularly the lower based alcohol such as ethyl, propyl, and buthyl), and methyl pyrrolidone. It is contemplated that such co-solvents would form approximately 1 to 20 percent by weight of the screen printing ink composition.

| MULTI-PURPOSE ACRYLIC YELLOW SCREEN PRINTING INK AND COATING | PARTS BY WEIGHT |
|---|---|
| Clear Acrylic Base (60% by wt. methyl salicylate and 40% by wt. resin composition) | 78.0 |
| Pigment Yellow 74 (Hilton-Davis) Pre-mixed: pigment 40% alkyd resin 20% solvent 40% | 13.0 |
| Mineral Spirits | 6.0 |
| Flow Agent (Silicone rubber) | 3.0 |

| MULTI-PURPOSE ACRYLIC YELLOW SCREEN PRINTING INK AND COATING | PARTS BY WEIGHT |
|---|---|
| | 100.0 |

Finally, the following composition represents another typical screen printing ink composition:

| MULTI-PURPOSE MODIFIED SCREEN PRINTING INK COMPOSITION | PARTS BY WEIGHT |
|---|---|
| Methyl Salicylate | 47% |
| Pigment Solids | 5% |
| Alkyd Resin Solids | 3% |
| Acrylic Resin Solid | 31% |
| Mineral Spirits | 11% |
| Flow Agent (silicone rubber) | 3% |
| | 100% |

There are many significant advantages to the composition described hereinabove. First, the screen printing composition disclosed does not produce vapor toxicity. Besides lacking vapor toxicity, the methyl salicylate that forms the basic solvent in the composition has not been shown to be carcinogenic and is safe for skin contact under normal screen printing operations.

In addition, the present composition is designed and formulated to yield a very high gloss finish. This is achieved because of improved flow of the ink or coating coupled with the solvent having a relatively high boiling point. Also, the present composition has improved adhesion characteristics. This occurs because the methyl salicylate is very effective in dissolving the resin. It is believed that the present composition tends to condition the underlying substrates which gives rise to the improved adhesion characteristics.

The methyl salicylate is quite versatile and effectively mixes and dissolves a wide range of resins and pigments. This has been a definite shortcoming of solvents used in conventional ink compositions. In addition, the methyl salicylate has excellent pigment wetting characteristics.

From the foregoing discussion, it is seen that the present screen printing ink or coating composition lacks vapor toxicity and consequently the composition of the present invention may be utilized in facilities without expensive ventilation systems that are customarily designed for conventional screen printing applications. In addition, the solvent methyl salicylate in the present composition effectively dissolves the resin and pigment compositions and consequently the flow characteristics of the ink or coating are greatly improved which results in an improved screen printed product.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A screen printing ink composition comprising: an acrylic base including methyl salicylate and a resin composition wherein the methyl salicylate forms approximately 60% by weight of the acrylic base while the resin composition forms approximately 40% by weight of the acrylic base; and a pigment composition mixed with the acrylic base and wherein the pigment composition forms approximately 5 to 40 percent by weight of the screen printing ink composition while the acrylic base forms approximately 60 to 95 percent by weight of the screen printing ink composition.

2. A substantially non-toxic screen printing ink composition comprising: a resin composition forming approximately 5 to 55 percent by weight of the ink composition; methyl salicylate forming approximately 40 to 80 percent by weight of the ink composition; and a pigment composition comprising approximately 5 to 40 percent by weight of the ink composition.

3. The screen printing ink composition of claim 2 wherein the resin composition includes a methacrylic polymer composition.

4. The screen printing ink composition of claim 2 wherein the resin composition comprises a methyl/butyl methacrylate co-polymer composition.

5. The screen printing ink composition of claim 2 wherein the resin composition is selected from the group consisting of methacrylate, styrene, and vinyl.

6. The screen printing ink composition of claim 5 wherein the pigment composition is a dry pigment powder.

7. A screen printing coating composition comprising: a resin composition forming approximately 10 to 60 percent by weight of the screen printing coating composition mixed with methyl salicylate forming approximately 40 to 90 percent by weight of the composition.

8. A screen printing coating composition comprising: a resin composition forming approximately 10 to 60 percent by weight of the screen printing coating composition; methyl salicylate forming approximately 40 to 90 percent by weight of the composition; and a co-solvent forming approximately 1 to 20 percent by weight of the total composition.

9. The screen printing coating composition of claim 8 further including a pigment composition forming approximately 5 to 40 percent by weight of the screen printing composition.

10. The screen printing composition of claim 8 wherein the co-solvent is selected from the group consisting of water, alcohol, mineral spirits, and methyl pyrrolidone.

* * * * *